Dec. 18, 1928.  
W. C. CORYELL  
1,695,274  
SCREW-DOWN MECHANISM FOR ROLLING MILLS  
Filed Aug. 13, 1925  2 Sheets-Sheet 2
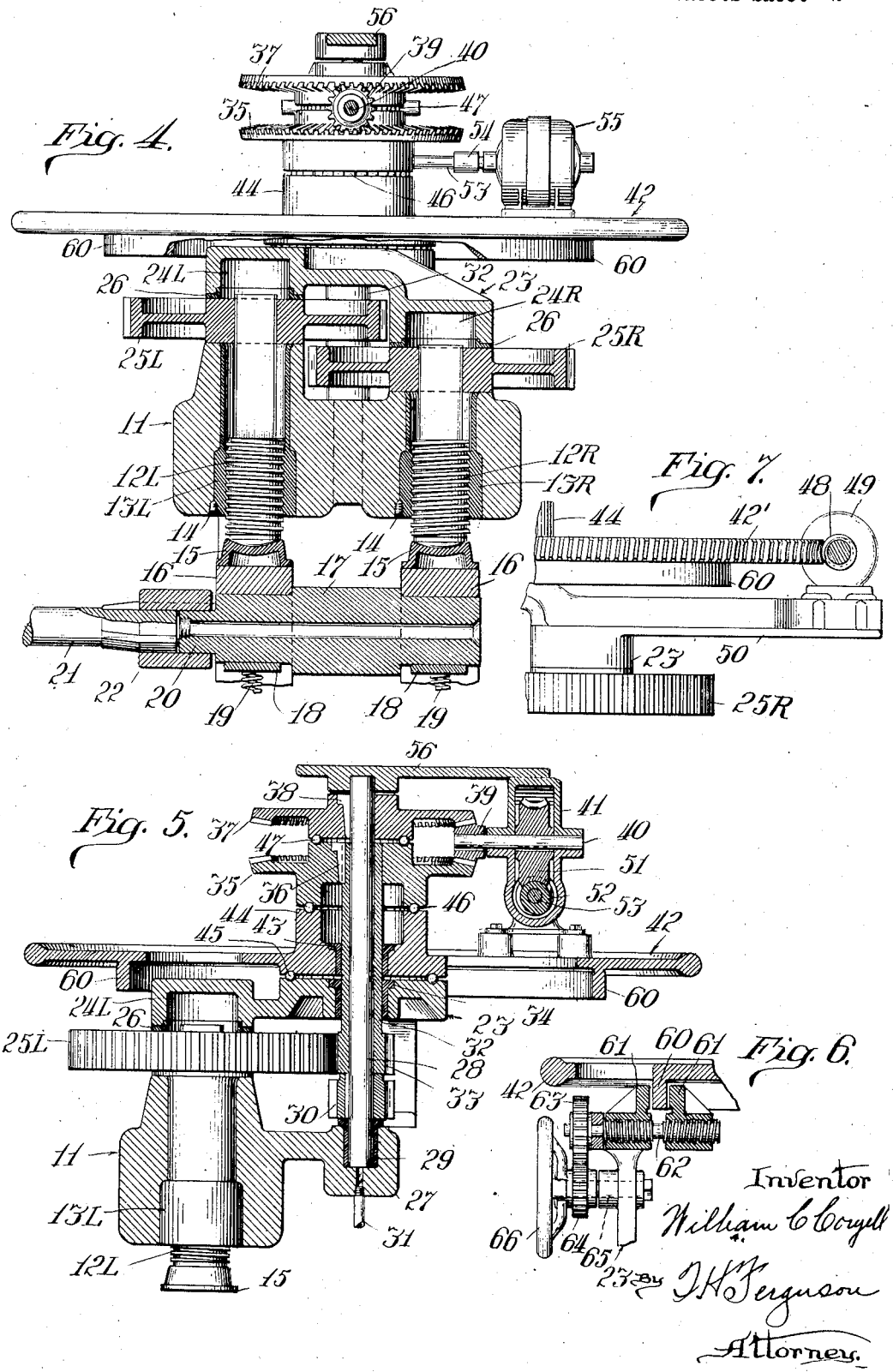

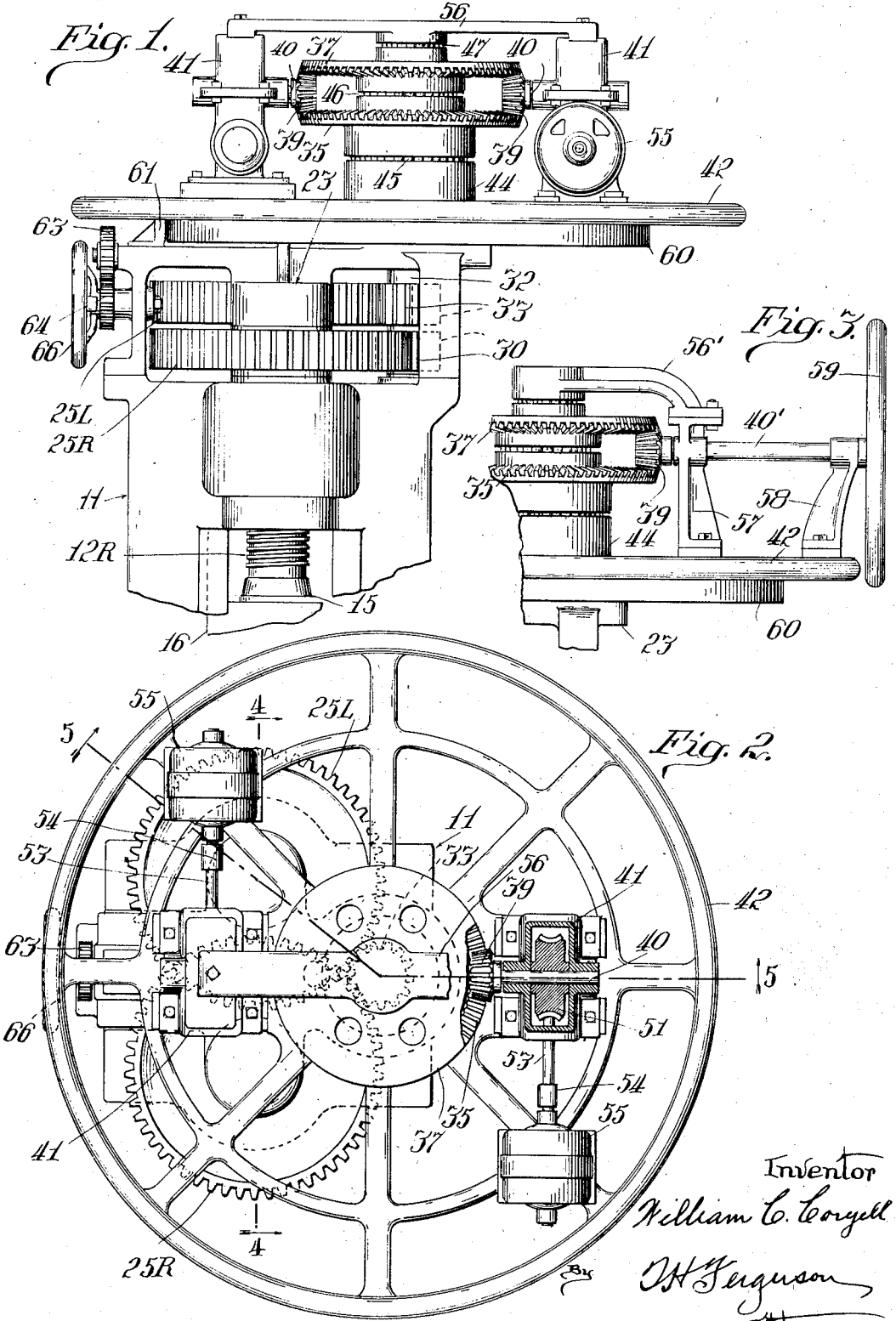

Patented Dec. 18, 1928.

1,695,274

UNITED STATES PATENT OFFICE.

WILLIAM C. CORYELL, OF YOUNGSTOWN, OHIO.

SCREW-DOWN MECHANISM FOR ROLLING MILLS.

Application filed August 13, 1925. Serial No. 49,983.

The present invention relates to screw-down mechanisms for use upon rolling mills generally, and more particularly to mechanisms of this class wherein the rolls of the mill are adjustable independently to bring them into parallelism, and then when so adjusted, further adjustable up and down while maintained in parallelism.

The principal object of the invention is to provide a screw-down mechanism having these two capabilities of adjustment, which shall be simple in construction, efficient in operation and economical to manufacture. To this end I provide a novel driving structure wherein actuating members and pinions for driving the holding-down screws are mounted compactly, one pinion and its actuating member on a shaft for operating one end of the roll, and the other pinion and its actuating member on a sleeve rotatable upon said shaft for operating the other end of the roll. This concentric or co-axial arrangement lends itself readily to different embodiments. If the screws have left and right hand threads respectively, then the driving members move oppositely to give the adjustment with the rolls in parallelism and in the same direction to adjust the rolls into parallelism. On the other hand by giving both screws the same threads, the actuating members move together to give the adjustment in parallelism and oppositely to adjust to parallelism. In the former case a preferred construction is to constitute the actuating members bevel gear wheels and to drive them by an intermediate bevel gear pinion for the adjustment while maintaining parallelism, and to rotate the three bevel gear wheels together as a unit for the adjustment to parallelism, the intermediate pinion being mounted on a rotary member for this purpose. The different features and possible embodiments of the invention will be more fully understood upon reference to the following detailed description, taken in connection with the accompanying drawings, and the scope of the invention will be particularly pointed out in the appended claims.

In said drawings, Fig. 1 is a side elevation of the upper portion of a rolling mill having a screw-down mechanism constructed in accordance with the present invention for the operation of holding-down screws having right and left hand threads respectively; Fig. 2 is a plan view of the same; Fig. 3 is an elevation illustrating a modification wherein the members for giving the adjustment of the rolls while maintaining them in parallelism are actuated by a manually operated hand wheel instead of by power driven members; Fig. 4 is a vertical section of the structure of Fig. 1, taken on a plane indicated by the line 4—4 of Fig. 2; Fig. 5 is a similar vertical section, taken on a plane indicated by the line 5—5 of Fig. 2; Fig. 6 is a detail view illustrating the brake and clamping mechanism for controlling the rotary member by which the structure of Fig. 1 is given its adjustment into and out of parallelism; and Fig. 7 is an elevation of a part of the same structure illustrating a modification wherein said rotary member is power driven. Throughout these views like characters refer to like parts.

Referring to said drawings in detail, 11 designates the housing of the rolling mill upon which the screw-down mechanism is employed. This housing is provided with openings for the passage of the holding-down screws $12^L$ and $12^R$. These are threaded as usual through corresponding screw-down nuts $13^L$ and $13^R$, fitted and secured in said openings by any suitable means, as the screws 14. Each holding-down screw is provided with a breaker block 15 which bears upon the top roll bearings 16. The bearings 16 are engaged by the necks of the roll 17 and the latter is held up in position against the top roll bearings 16 by top roll carriers 18 which bear against the under side of the necks of the roll 17. The carriers 18 may be forced upward by any suitable mechanism, and in this instance springs 19 are shown for this purpose, although it is obvious that counterweights might be employed such as illustrated in my prior Patent No. 1,233,647, dated July 17, 1917. The roll 17 is provided at one end with a projection 20 which is adapted to be connected to the driving spindle 21 by a coupling 22. The rolling mill construction illustrated is merely typical, and only one roll of the mill is illustrated. It should therefore be understood that the mill construction may be greatly varied, and still it will be possible to use the novel screw-down mechanism herein disclosed.

The upper portion of the housing 11 is provided with a screw-down frame 23 wherein spaces $24^L$ and $24^R$ are provided for the upward movements of the screws $12^L$ and $12^R$ respectively. At a point beneath these spaces the holding-down screws are provided with driving members in the form of gear wheels 25$^L$ and 25$^R$. These wheels are provided with square or other angular openings through which the upper ends of the screws 12$^L$ and 12$^R$ pass, their upper ends being shaped to fit the holes in the wheels. The wheels 25$^L$ and 25$^R$ are mounted to rotate between the screw-down frame 23 and the upper part of the housing 11. Bearing rings 26 are positioned on the upper sides of these wheels as illustrated. With this construction the rotation of the wheels 25$^L$ and 25$^R$ causes a corresponding rotation of the screws 12$^L$ and 12$^R$ respectively, the screw in each instance passing upward through the opening in the wheel.

The screw-down frame 23 has a portion which extends beyond the peripheries of the wheels 25$^L$ and 25$^R$, and directly beneath such portion is an extension 27 upon the housing 11. The latter provides a support for the lower end of a vertical shaft 28 which lies close to the peripheries of both gear wheels 25$^L$ and 25$^R$. This shaft also extends through the overhanging portion of the screw-down frame 23. The shaft 28 has a foot bearing 29 in the extension 27 of the housing 11 and just above the latter is provided with a driving pinion 30 which meshes with the gear wheel 25$^R$. The bearing at the lower end of the shaft is provided with a suitable lubricating connection 31. Surrounding shaft 28 is a concentric shaft or sleeve 32. This sleeve carries at its lower end a driving pinion 33 which meshes with the gear wheel 25$^L$. At the point where the sleeve 32 passes through the screw-down frame 23 it is provided with a bearing 34 in the form of a bushing of suitable metal. The upper end of the sleeve 32 carries a driving member in the form of a bevel gear wheel 35. The latter is secured to the sleeve in any suitable way, as by the key 36. In like manner the upper end of the shaft 28 is provided with a driving member in the form of a bevel gear wheel 37 which is similarly secured to the shaft by a key 38. The teeth upon the wheels 35 and 37 oppose each other and are in position to be engaged by intermediate bevel pinions 39. With this construction it will be seen that when either of the pinions 39 is driven, the actuating wheels 35 and 37 will be moved in opposite directions. Such movement will cause the driving pinions 30 and 33 to move in opposite directions to drive the gear wheels 25$^L$ and 25$^R$ and the screws 12$^L$ and 12$^R$ in opposite directions. Such a movement will, because of the right and left hand threads, cause the screws to rise and fall uniformly, thus raising or lowering the breaker blocks 15 without changing the angularity of the upper roll 17.

From what has been said it will be seen that if the actuating wheels 35 and 37 can be moved together as a unit, about the axis of the shaft 28, then the screws 12$^L$ and 12$^R$ would be moved uniformly in the same direction, and then, because of the right and left hand threads upon them, one screw 15 would be raised at a given rate and the other screw 15 would be lowered at the same rate. Such movement would change the angular position of the roll 17 and operate to change its angularity with reference to its companion roll. By this means it would be possible to bring the two rolls into exact parallelism. Now, in order to accomplish this movement of the driving wheels 35 and 37 as a unit, about the axis of the shaft 28, I provide means for rotating all the bevel gear wheels 35, 37, and 39 together. For this purpose the shaft 40 of each bevel pinion 39 is mounted in bearings in a casing 41, and the latter is mounted upon a rotary member 42 which rotates about the axis of the shaft 28. The member 42 is, in the form of the invention illustrated in Fig. 1, a large hand wheel and at its center is provided with a bearing in the form of a bushing 43 which engages the outer surface of the sleeve 32. To assist in ease of movement, the hub 44 of the wheel 42 and the adjacent portion of the screw-down frame 23 are provided with intermediate ball bearings 45. In like manner, the upper portion of the hub 44 and the lower portion of the gear wheel 35 are provided with ball bearings 46. Preferably also, ball bearings 47 are provided between the hubs of the wheels 35 and 37. With this construction it will be seen that a rotation of the wheel 42 will cause a differential movement of the actuating members 35 and 37 with a resulting differential movement of the breakers 15, as previously pointed out.

Although the member 42 is shown as a hand wheel in the form of the invention illustrated in Fig. 1, yet it will be clear that the same may be replaced by a member 42', which is the same in construction as the member 42, except that it is provided with worm gear teeth upon its periphery, as clearly illustrated in Fig. 7. The teeth upon the member 42 are in mesh with a driving worm 48 upon the shaft of an electric motor 49 secured to the outer end of an extension 50 of the screw-down frame 23. Where this construction is employed the driving of the member 42' is accomplished by the motor 49 which may be suitably controlled from a distant point, as the pulpit of a rolling mill.

In the embodiment illustrated in Fig. 1, the shafts 40 which carry the bevel pinions 39 are mounted in casings 41, as before noted, and these casings enclose in each instance a worm wheel 51 which is secured to the shaft 40 and meshes with a worm 52, whose shaft 53 is coupled by a coupling 54 to the shaft of an electric motor 55 mounted directly upon the rotary member 42. When it is desired to drive the wheels 35 and 37 oppositely to raise the breakers 15, then one of the motors 55 is operated and the other is inactive, and when it is desired to move the breakers in the opposite direction then the first motor is inactive and the second is thrown into circuit and driven.

At this point it may be noted that the shaft 28 not only has a foot bearing in the projection 27 but also has a top bearing in a yoke 56 which extends between the casings 41 to which it is secured at its opposite ends.

In lieu of the power driven shafts 40, which carry the bevel pinions 39, I may employ in some instances a similar shaft 40', which finds its bearings in brackets 57 and 58 secured to the upper side of the rotary member 42, as illustrated in Fig. 3. The shaft 40' is provided with a hand wheel 59. By rotation of the latter it is possible to rotate the bevel pinion 39 and thus actuate the wheels 35 and 37 to bring about the adjustment of the rolls up and down without changing the angular relation of the one to the other. In this modified structure the rotation of the wheel 42 brings about the adjustment into and out of parallelism just as before. In this form of the invention the yoke 56 is replaced by yoke 56' which is a continuation of the bracket 57.

For the control of the rotary member 42 I provide the under side of the member with a peripheral flange 60 which cooperates with two clamping and braking members 61 mounted upon right and left handed threads on a shaft 62 suitably journaled in portions of the screw-down frame 23. In the embodiment shown the outer end of the shaft 62 carries a gear wheel 63 which meshes with a gear wheel 64 mounted on a stud shaft 65 which carries a hand wheel 66. By the rotation of the wheel 66, the shaft 62 is rotated and the members 61 are drawn together or separated. When drawn together, they contact with the flange 60 and serve to brake the rotation of the wheel 42 and, when drawn together tight enough, clamp the wheel 42 against rotation. An opposite movement of the wheel 66 frees the members 61 from the flange 60 and leaves the wheel free for rotation. Obviously, other braking and clamping means might be employed for the control of the rotary member 42.

It will be understood that in carrying out my invention it is possible to make changes and alterations in the structures other than the changes and alterations embodied in the modifications illustrated and described, without departing from the spirit and scope of my invention. I therefore do not wish to be limited to the particular arrangements and structures disclosed, but aim to cover by the terms of the appended claims not only such modifications as are disclosed but all those which properly come within the purview of my invention.

It will be obvious too that it will be possible to control the circuits of the motors 55, as well as those of the motor 49, as heretofore noted, from a central control point such as the usual pulpit of a rolling mill plant.

It will be apparent from what has been described heretofore that the pinion 30 and gear wheel 25$^R$ constitute a gear train between the sleeve 32 and the holding-down screw 12$^R$ and in like manner pinion 33 and gear wheel 25$^L$ constitute a gear train between shaft 28 and holding-down screw 12$^L$ and that such trains might be replaced by gear trains having more wheels in each train and yet the invention would not be departed from.

It may also be noted that although I have described the main screws 12$^L$ and 12$^R$ as "holding-down" screws, they are also known as "screw-down" screws and "adjusting" screws.

What I claim as new and desire to secure by a patent of the United States is:

1. A screw-down mechanism for rolling mills, comprising holding-down screws, two opposed bevel gear wheels, an intermediate bevel gear wheel meshing with said opposed wheels, means for rotating said intermediate wheel to drive said opposed wheels, means for moving said three wheels as a unit, a shaft to which one of said opposed gear wheels is secured, a sleeve rotatable on said shaft, the other of said opposed gear wheels being secured to said sleeve, and independent gear trains between said screws and shaft and sleeve respectively whereby different adjustments of said screws are obtained in response to unitary and differential movements of said gear wheels.

2. A screw-down mechanism for rolling mills, comprising holding-down screws, a vertical shaft, a sleeve rotatable on said shaft, two opposed bevel gear wheels secured respectively to said shaft and sleeve, a rotary member movable about the axis of said vertical shaft, a bearing on said member, a horizontal shaft in said bearing, an intermediate bevel gear wheel secured to said horizontal shaft and intermeshing with said opposed bevel gear wheels, means whereby said horizontal shaft may be rotated, and gearing operative between said screws and said vertical shaft and sleeve respectively to adjust said screws oppositely or together in response to the movements of said rotary member and horizontal shaft actuating means.

3. A screw-down mechanism for rolling mills, comprising a housing having a screw-down frame, a telescoping shaft and sleeve mounted for independent relative rotation in said frame, a rotary member mounted upon said frame for rotation about the axis of said shaft and sleeve, means for clamping said rotary member to said frame, driving members secured to said shaft and sleeve respectively, a third driving member secured to said rotary member, driving connections between said third driving member and said first mentioned driving members for rotating said latter members in one way when said rotary member is clamped and in another way in response to the rotation of said rotary member when the latter is unclamped and rotated, and gearing between said screws and said shaft and sleeve respectively to adjust said screws up and down together or differentially in accordance with the operations of said driving members.

4. A screw-down mechanism for rolling mills, comprising a housing having a screw-down frame, a vertical sleeve journaled in said frame, a vertical shaft rotatable in said sleeve, a horizontal rotary member mounted on said frame for rotation about the axis of said shaft and sleeve, a peripheral rib on the under side of said rotary member, clamping means mounted on said frame and operative to engage said rib to clamp said rotary member, driving members secured to said shaft and sleeve respectively, a third driving member secured to said rotary member, driving connections between said third driving member and said first mentioned driving members for rotating said latter members in one way when said rotary member is clamped and in another way in response to the rotations of said rotary member when the latter is unclamped and rotated, and gearing between said screws and said shaft and sleeve respectively to adjust said screws up and down together or differentially in accordance with the operations of said driving members.

In witness whereof I hereunto subscribe my name this 29th day of July, 1925.

WILLIAM C. CORYELL.